United States Patent [19]

Gomyo et al.

[11] Patent Number: 4,943,620

[45] Date of Patent: Jul. 24, 1990

[54] METHOD FOR THE PREPARATION OF A SILICONE-BASED PRESSURE-SENSITIVE ADHESIVE

[75] Inventors: Shiro Gomyo; Takahide Kobori, both of Annaka, Japan

[73] Assignee: Shin-Etsu Chemical Co., Ltd., Tokyo, Japan

[21] Appl. No.: 297,874

[22] Filed: Jan. 17, 1989

[30] Foreign Application Priority Data

Jan. 20, 1988 [JP] Japan .................................. 63-10314

[51] Int. Cl.$^5$ ............................................. C08F 283/00
[52] U.S. Cl. ..................................... 525/474; 528/21; 528/24
[58] Field of Search ..................... 528/21, 24; 525/474

[56] References Cited

U.S. PATENT DOCUMENTS 3,231,542  1/1966  Elsinger et al. ........................ 528/24
4,222,917  9/1980  Razzano et al. ....................... 528/21

FOREIGN PATENT DOCUMENTS 746193  3/1956  United Kingdom ................. 528/21

*Primary Examiner*—Melvyn I. Marquis
*Assistant Examiner*—Karen A. Hellender
*Attorney, Agent, or Firm*—Wyatt, Gerber, Burke and Badie

[57] ABSTRACT

The invention proposes use of ammonia water in place of a conventional caustic alkali or amine compound as a catalyst in the siloxane rearrangement reaction for the preparation of a silicone-based pressure-sensitive adhesive between a poly(diorganosiloxane) having a linear molecular structure and another organopolysiloxane composed mainly of the monofunctional organosiloxane units and tetrafunctional siloxane units. The ammonia water after completion of the reaction can be easily and completely removed by distillation so that the resultant adhesive product is free from any alkaline residue of the catalyst to be imparted with greatly improved stability against viscosity changes and excellent electrical properties along with high reproducibility of the product quality.

12 Claims, No Drawings

METHOD FOR THE PREPARATION OF A SILICONE-BASED PRESSURE-SENSITIVE ADHESIVE

BACKGROUND OF THE INVENTION

The present invention relates to a method for the preparation of a silicone-based pressure-sensitive adhesive. More particularly, the invention relates to a method for the preparation of a silicone-based pressure sensitive adhesive having a high purity and stability of quality relative to changes in the viscosity and suitable for forming an adhesive layer on pressure-sensitive adhesive tapes, electrical insulation tapes, masking tapes for painting works, heat-insulation tapes and sheets and the like in an easily controllable way and with outstandingly low costs.

It is known that silicone-based pressure-sensitive adhesives of a typical class can be prepared by undertaking a siloxane rearrangement reaction between a first organopolysiloxane having a substantially linear molecular structure or a diorganopolysiloxane, e.g., dimethyl polysiloxane, represented by the average unit formula $R^1{}_m SiO_{(4-m)/2}$, in which $R^1$ is a substituted or unsubstituted monovalent hydrocarbon group and m is a positive number in the range from 1.8 to 2.1, and a second organopolysiloxane composed mainly of monofunctional siloxane units of the formula $R^2{}_3 SiO_{1.5}$, in which $R^2$ is a substituted or unsubstituted monovalent hydrocarbon group, and tetrafunctional siloxane units of the formula $SiO_2$. Although the reaction can proceed even in the absence of any catalyst as is taught in Japanese Patent Publications 32-5099 and 33-2881, it is usual that a strongly basic compound such as a caustic alkali, e.g., sodium and potassium hydroxides, or an amine (see, for example, Japanese Patent Kokai 61-108682) is added as a catalyst to the mixture of the organopolysiloxanes because the process without using a catalyst must be performed at a high reaction temperature taking a long time with a consequently low productivity. The method using a caustic alkali as a catalyst has a problem because the alkaline catalyst after completion of the reaction can be removed completely only with extreme difficulties and any trace amount of the caustic alkali remaining in the product is detrimmental against the stability of the viscosity of the product to cause a decrease in the viscosity due to the alkali-catalyzed scission of the siloxane linkages. The remaining amount of the alkaline catalyst can of course be neutralized to avoid the detrimental effect of the alkali by adding an acid only to cause another problem, namely, that the precipitates of the salt formed by the neutralization can hardly be removed by filtration due to the very high viscosity of the adhesive. The problems are about the same as above in the use of an amine as the catalyst with the added problem that an adhesive product containing a trace amount of an amine compound is liable to cause discoloration. In short, the method of using a caustic alkali or an amine as the catalyst is disadvantageous in respect to the relatively low heat resistance as well as poor electrical properties of the product.

In this regard, an alternative method is proposed in Japanese Patent Kokai 61-108682 according to which a mixture of the two types of organopolysiloxanes is admixed with an organosilazane compound, e.g., hexamethyl disilazane, as a catalyst. This method is advantageous in respect to the stability of the viscosity of the product adhesive because the decomposition residue of the catalyst are, taking hexamethyl disilazane as an example of the organosilazane compound, trimethyl silanol and hexamethyl disiloxane having volatilizability with little possibility of remaining in the product after complete stripping. A problem in the use of a disilazane compound is that these decomposition residue are reactive with the organopolysiloxanes to cause a viscosity decrease so that it is sometimes difficult to obtain full reproducibility of the product quality depending on the balance between the dissipated and reacted amounts of the residue.

SUMMARY OF THE INVENTION

The present invention accordingly provides a method for the preparation of a silicone-based pressure-sensitive adhesive by using a unique catalyst to be freed from the above described problems and disadvantages in the prior art methods.

The inventive method comprises the steps of: (a) adding ammonia water to a mixture of a first organopolysiloxane having a substantially linear molecular structure represented by the average unit formula $R^1{}_m SiO_{(4-m)2}$, in which $R^1$ is a substituted or unsubstituted monovalent hydrocarbon group and m is a positive number in the range from 1.8 to 2.1, of which at least 90% by moles of the overall siloxane units are diorganosiloxane units of the unit formula $R^1{}_2 SiO$, and a second organopolysiloxane composed mainly of the siloxane units of the formula $R^2{}_3 SiO_{0.5}$, in which $R^2$ is a substituted or unsubstituted monovalent hydrocarbon group, and siloxane units of the formula $SiO_2$ in a molar proportion of $R^2{}_3 SiO_{0.5}:SiO_2$ in the range from 0.4 to 2.0, to form a reaction mixture;

(b) agitating the reaction mixture to effect the siloxane rearrangement reaction between the first and the second organopolysiloxanes; and (c) removing the ammonia water from the reaction mixture.

DETAILED DESCRIPTION OF THE PREFERRED EMBODIMENTS

As is described above, the most characteristic feature of the inventive method consists in the use of ammonia water as a catalyst for the siloxane rearrangement reaction between the organopolysiloxanes. Advantageously, the reaction can proceed even at room temperature in a considerably high velocity so that the loss of the ammonia water by vaporization in the course of the reaction is small. After completion of the reaction, the ammonia water can easily and completely be removed by heating the reaction mixture at 100° to 120° C. under bubbling of nitrogen gas so that the product adhesive is highly heat resistant having a viscosity with good reproducibility.

The first organopolysiloxane, as one of the starting reactants in the inventive method, is a known material and any of the conventional ones can be used without particular limitations. The organopolysiloxane preferably has a substantially linear molecular structure mainly composed of the difunctional siloxane units of the formula $SiR^1{}_2 O$ or represented by the average unit formula $R^1{}_m SiO_{(4-m)/2}$, in which $R^1$ is a substituted or unsubstituted monovalent hydrocarbon group and m is a positive number in the range from 1.8 to 2.1. Preferably, at least 90% by moles of the siloxane units forming the organopolysiloxane are the above mentioned difunctional siloxane units. The group denoted by $R^1$ is exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms, cyano groups and the like, e.g., chloromethyl, 3,3,3-trifluoropropyl and 2-cyanoethyl groups. The organopolysiloxane preferably has an average degree of polymerization, i.e. number of the siloxane units in a molecule, in the range from 100 to 10,000.

The second organopolysiloxane, as the other of the starting materials of the inventive method, is also known in the art and any of the conventional ones can be used without particular limitations. The organopolysiloxane is basically composed of the monofunctional siloxy units of the formula $R^2{}_3SiO_{0.5}$ and tetrafunctional siloxane units of the formula $SiO_2$ although it is optional that a part of the monofunctional units is replaced with difunctional and/or trifunctional siloxane units so that the moiety other than the $SiO_2$ units can be represented by the average unit formula $R^2{}_n SiO_{(4-n)/2}$, in which $R^2$ is a substituted or unsubstituted monovalent hydrocarbon group exemplified by those given as the examples of the group denoted by $R^1$ and n is a positive number in the range from 2.6 to 3.0.

The molar ratio of the monofunctional units or the moiety of the average unit formula $R^2{}_n SiO_{(4-n)/2}$ to the tetrafunctional units $SiO_2$ in the second organopolysiloxane is preferably in the range from 0.4 to 2.0. When this molar ratio is smaller than 0.4, the pressure sensitive adhesive prepared therefrom has a relatively poor adhesive bonding strength having no practical usefulness. When this molar ratio is larger than 2.0, on the other hand, the cohesive force of the adhesive is unduly decreased.

In carrying out the inventive method, the above described first and second organopolysiloxanes are mixed together. The mixing ratio of the first to the second organopolysiloxane is preferably in the range from 0.3 to 3.0 by weight. When this weight ratio is smaller than 0.3, a pressure-sensitive adhesive having a satisfactorily high cohesive force cannot be obtained. When this weight ratio is larger than 3.0, on the other hand, the adhesive prepared therefrom is not practically useful in respect of the decreased adhesive bonding strength and anchoring power.

The mixture of the two organopolysiloxanes is then admixed with ammonia water as a catalyst. The amount of the ammonia water is preferably in the range from 0.2 to 2.0% by weight based on the mixture of the organopolysiloxanes, the amount being calculated for an ammonia water of 27% by weight of $NH_3$ concentration. When the amount of the ammonia water is too small, the reaction velocity would be unduly low to greatly decrease the productivity of the process as a method of industrial production. On the other hand, no further additional advantages are obtained by increasing the amount of the ammonia water over the above mentioned upper limit. Rather, use of an excessively large amount of ammonia water is undesirable because the ammonia water after completion of the reaction must be removed thus taking an increased length of time which is disadvantageous.

The ammonia-catalyzed reaction of the inventive method proceeds by the scission of the siloxane linkages by the ammonia water to form silanol groups followed by silanol condensation by dehydration. Although the reaction can proceed even at room temperature with a considerably high velocity, it is industrially advantageous that the reaction mixture is heated at a temperature, for example, in the range from 30° to 60° C. It is optional or rather preferable that the reaction mixture is diluted by adding an organic solvent which can dissolve both of the first and second organopolysiloxanes and is inert thereto. Examples of suitable organic solvent include cyclohexane, toluene, xylene and the like though not limited thereto. The reaction is usually complete within 2 to 12 hours.

The reaction mixture after completion of the reaction must be freed from the ammonia water contained therein. A convenient and efficient method for removing the ammonia water is to heat the reaction mixture after completion of the reaction at a temperature, for example, in the range from 100° to 120° C. under bubbling of nitrogen gas thereinto. When an organic solvent azeotropically boiling with water is used, the water can be efficiently removed by azeotropic distillation. The ammonia water can be removed in this way so completely as to show no smell of ammonia or to be evidenced by a test using litmus paper and the resultant product is almost completely free from any trace amount of the catalyst so that it is imparted with excellent stability of the viscosity and enhanced heat resistance in addition to the advantage that the quality of the product is fully reproducible. It is of course known that the product adhesive can be used in electric and electronic applications quite satisfactorily to give high-performance instruments due to the absence of any ionic matters.

The silicone-based pressure-sensitive adhesive prepared in the above described manner according to the inventive method is used preferably with admixture of a crosslinking agent. Suitable crosslinking agents, which should be selected depending on the type of the organopolysiloxane, include an organic peroxide such as benzoyl peroxide and the like and, when the organopolysiloxanes have vinyl groups bonded to the silicon atoms, a combination of an organohydrogenpolysiloxane and a platinum compound as a catalyst of the so-called hydrosilation reaction. The amount of the organic peroxide is in the range from 1 to 4% by weight based on the amount of the organopolysiloxane contained in the adhesive. The amount of the organohydrogenpolysiloxane should be sufficient to give from 0.5 to 2.0 moles of the silicon-bonded hydrogen atoms per mole of the vinyl groups and the amount of the platinum catalyst is in the range from 10 to 100 ppm by weight based on the amount of the polysiloxane content. When the pressuresensitive adhesive admixed with such a crosslinking agent is heated to effect crosslinking, the resultant adhesive surface has strong tackiness to exhibit a pressure-sensitive adhesive bonding strength of as high as 700 g/19 mm or even larger. Accordingly, the silicone-based pressure-sensitive adhesive prepared according to the inventive method can be used advantageously in the preparation of heat- and cold-resistant pressure-sensitive adhesive tapes and electrical insulation tapes, masking tapes and heat-insulation tapes having resistance against chemicals and the like.

In the following, the method of the present invention is described in more detail by way of examples, in which the term of "parts" always refers to "parts by weight" and the values of viscosity are all those obtained by the measurement at 25° C. The pressure-sensitive adhesives prepared in the examples were evaluated for several properties by the testing methods described below according to JIS Z 0237.

TACKINESS

Measurements were performed by the inclined-surface ball-tack method. Thus, steel balls of different diameters were rolled down a surface, having an angle of inclination of 30°, coated with the pressure-sensitive adhesive under testing. After rolling down an approach runway of 10 cm length a recording was made of the diameter of the largest steel ball stopped within 10 cm of rolling down the adhesive-coated surface. The steel balls were of the grade SUJ2 as specified in JIS G 4805 and the measurements were performed at 23±2° C. in an atmosphere of a relative humidity of 60±5%.

ADHESIVE BONDING STRENGTH

A test piece coated with the pressure-sensitive adhesive under testing was gently applied to the center portion of the surface of a stainless steel plate and then bonded thereto by pressing with a metal made roller coated with a rubber layer of about 6 mm thickness and having a weight of 2000±50 g moved once back and forth at a velocity of 300 mm/minute. The test piece on the stainless steel plate was kept standing as such for 16 hours in an atmosphere of 23±2° C. and a relative humidity of 60±5% and then peeled off from the substrate surface in an angle of 180° by continuously pulling at the free end at a velocity of 300 mm/minute to record the peeling resistance in g per 19 mm width.

COHESIVE FORCE

An adhesive-coated test piece having a length of 20 mm and a width of 10 mm was bonded to the surface of the same stainless steel made plate as used in the above test in a manner similar to above and kept standing for 30 minutes with a hanging load of 1000±10g in an atmosphere of 23±2° C. and a relative humidity of 60±5% to determine the distance of displacement of the test specimen from the starting position.

EXAMPLE 1

A poly(dimethyl siloxane) having a gum-like consistency with an average degree of polymerization of about 7000 and terminated with silanolic hydroxy groups at both ends of the molecular chain formed of recurring dimethyl siloxane units and another organopolysiloxane composed of $(CH_3)_3SiO_{0.5}$ units and $SiO_2$ units in a molar ratio of 0.8:1.0 each in an amount of 100 parts were dissolved in 140 parts of toluene and the mixture was heated with admixture of 2 parts of ammonia water of 27% concentration at a temperature of 30° to 35° C. for 5 hours with agitation. The thus obtained reaction mixture, which was cloudy in white, was then heated at a temperature of 110 to 115 °C for 2 hours under bubbling of nitrogen gas so that the ammonia water was removed completely by the azeotropic distillation with toluene, the distillate of toluene being returned to the reaction mixture, to leave a clear, colorless and viscous liquid having a viscosity of 1220 poise and containing 60.2% by weight of non-volatile matter, the balance being mainly toluene, as determined by heating at 105° C. for 3 hours.

An adhesive coating solution was prepared by admixing 100 parts of the above obtained liquid product with 50 parts of toluene and 1.2 parts of benzoyl peroxide. A tape of poly(tetrafluoroethylene) having a thickness of 80 μm (Nitoflon Tape No. 901, a product by Nitto Denko Co.) was coated with the adhesive coating solution in a thickness of 40 μm as dried and, after air-drying, heated at 150° C. for 5 minutes to effect curing of the organopolysiloxane. The thus prepared pressure-sensitive adhesive tape had properties of: at least 32 of ball-tack; 700 g/19 mm of adhesive bonding strength; and 0.12 mm of cohesive force. Thus, it was concluded that the above prepared organopolysiloxane product had excellent properties as a pressure-sensitive adhesive.

EXAMPLE 2

A solution was prepared by dissolving 180 parts of a poly(methyl phenyl siloxane) having a gum-like consistency with an average degree of polymerization of about 5000 and terminated with silanolic hydroxy groups at both ends of the molecular chain formed of recurring dimethyl siloxane units and methyl phenyl siloxane units, of which the molar ratio of the methyl groups to the phenyl groups was 95:5, and 200 parts of another organopolysiloxane composed of $(CH_3)_3SiO_{0.5}$ units and $SiO_2$ units in a molar ratio of 1:1 in 253 parts of toluene. The mixture was admixed with 3.1 parts of ammonia water of 27% concentration and agitated at 25 ° C. for 10 hours. The thus obtained reaction mixture, which was cloudy in white, was then heated at a temperature of 110° C. for 2 hours under gentle bubbling of nitrogen gas so that the ammonia water was removed completely by the azeotropic distillation with toluene to leave a clear, colorless and viscous liquid having a viscosity of 1050 poise and containing 60.1% by weight of non-volatile matter, the balance being mainly toluene.

An adhesive coating solution was prepared by admixing 100 parts of the above obtained liquid product with 50 parts of toluene and 1.2 parts of benzoyl peroxide. The same plastic tape as used in Example 1 was coated with the adhesive coating solution and, after air-drying, heated to effect curing of the organopolysiloxane in the same manner as in Example 1. The thus prepared pressure-sensitive adhesive tape had properties of: at least 32 of ball-tack; 720 g/19 mm of adhesive bonding strength; and 0.10 mm of cohesive force.

EXAMPLE 3

A solution was prepared by dissolving 100 parts of a poly(dimethyl siloxane) having a gum-like consistency with an average degree of polymerization of about 6000 and terminated with silanolic hydroxy groups at both ends of the molecular chain formed of recurring dimethyl siloxane units and 120 parts of another organopolysiloxane composed of $(CH_3)_3SiO_{0.5}$ units, $SiO_2$ units and $(C_6H_5)_2SiO$ units in a molar ratio of 0.8:1.0:0.05 in 147 parts of toluene. The mixture was admixed with 4.0 parts of ammonia water of 25% concentration and agitated at 40° C. for 3 hours. The thus obtained reaction mixture, which was slightly cloudy in white, was then heated at a temperature of 110° C. for 2 hours under gentle bubbling of nitrogen gas so that the ammonia water was removed completely by the azeotropic distillation with toluene to leave a clear. colorless and viscous liquid having a viscosity of 950 poise and containing 59.8% by weight of non-volatile matter, the balance being mainly toluene.

An adhesive coating solution was prepared in the same manner as in Example 1 using the above prepared liquid product. The same plastic tape as used in Example 1 was coated with the adhesive coating solution and, after air-drying, heated to effect curing of the organopolysiloxane in the same manner as in Example 1. The thus prepared pressure-sensitive adhesive tape had properties of: at least 32 of ball-tack; 810 g/19 mm of adhesive bonding strength; and 0.08 mm of cohesive force.

EXAMPLE 4

A solution was prepared by dissolving 95 parts of a poly(methyl phenyl vinyl siloxane) having a gum-like consistency with an average degree of polymerization of about 4500 and terminated with silanolic hydroxy groups at both ends of the molecular chain, of which the molar fractions of the methyl, phenyl and vinyl groups were 94%, 4% and 2%, respectively, and 110 parts of another organopolysiloxane composed of $(CH_3)_3SiO_{0.5}$ units in a molar ratio of 0.75:1.0 in 88 parts of toluene. The mixture was admixed with 3.0 parts of ammonia water of 27% concentration and agitated at 30° C. for 10 hours. The thus obtained reaction mixture, which was cloudy in white, was then heated at a temperature of 113° C. for 2 hours under gentle bubbling of nitrogen gas so that the ammonia water was distilled off completely to leave a clear, colorless and viscous liquid having a viscosity of 1000 poise and containing 60.2% by weight of non-volatile matter, the balance being mainly toluene.

An adhesive coating solution was prepared by admixing 100 parts of the above obtained liquid product with 50 parts of toluene and 1.2 parts of benzoyl peroxide. The same plastic tape as used in Example 1 was coated with the adhesive coating solution and, after air-drying, heated to effect curing of the organopolysiloxane in the same manner as in Example 1. The thus prepared pressure-sensitive adhesive tape had properties of: at least 32 of ball-tack; 750 g/19 mm of adhesive bonding strength; and 0.10 mm of cohesive force.

Separately, another pressure-sensitive adhesive coating solution was prepared by admixing 100 parts of the same liquid reaction product with 50 parts of a poly(methyl hydrogen siloxane) expressed by the formula

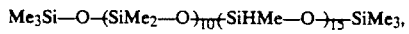

in which Me is a methyl group, and chloroplatinic acid in an amount of 30 ppm as platinum based on the amount of the organopolysiloxane. The same plastic tape as used in Example 1 was coated with this coating solution in a thickness of 40 μm as dried and, after air drying, heated at 100° C. for 5 minutes to effect curing of the organopolysiloxane. The thus prepared pressure sensitive adhesive tape had properties of: at least 32 of ball-tack; 740 g/19 mm of adhesive bonding strength; and 0.04 mm of cohesive force.

EXAMPLE 5

A solution was prepared by dissolving 95 parts of a poly(methyl siloxane) having a gum-like consistency with an average degree of polymerization of about 4500 and composed of $(CH_3)_2SiO$ units and $CH_3SiO_{1.5}$ units in a molar ratio of 0.98:0.02 and 100 parts of another organopolysiloxane composed of $(CH_3)_3SiO_{0.5}$ units, $SiO_2$ units and $CH_3SiO_{1.5}$ units in a molar ratio of 0.704:1.0;0.064 in 130 parts of toluene. The mixture was admixed with 2.0 parts of ammonia water of 27% concentration and agitated at 35° to 40° C. for 4 hours. The thus obtained reaction mixture, which was cloudy in white, was then heated at a temperature of 110° C. for 2 hours under bubbling of nitrogen gas so that the ammonia water was distilled off completely by the azeotropic distillation with toluene to leave a clear, colorless and viscous liquid which was admixed with a small volume of toluene so as to have a viscosity of 1250 poise and a content of the non-volatile matter of 60%, the balance being mainly toluene.

A pressure-sensitive adhesive tape prepared by using the thus obtained liquid product in the same manner as in Example 1 had properties of: at least 32 of ball-tack; 710 g/19 mm of adhesive bonding strength; and 0.03 mm of cohesive force.

EXAMPLE 6

A solution was prepared by dissolving 90 parts of a poly(dimethyl siloxane) having a gum-like consistency with an average degree of polymerization of about 7200, of which 80% and 20% on an average of the molecular chain ends were blocked with silanolic hydroxy groups and trimethyl silyl groups, respectively, and 100 parts of another organopolysiloxane composed of $(CH_3)_3SiO_{0.5}$ units and $SiO_2$ units in a molar ratio of 0.8:1.0 in 127 parts of cyclohexane and the mixture was heated with admixture of 1.9 parts of ammonia water of 20% concentration at a temperature of 40° C. for 6 hours with agitation. The thus obtained reaction mixture, which was cloudy in white, was then heated under reflux at a temperature of 70° C. for 4 hours to distil off the ammonia water azeotropically with cyclohexane. Subsequent addition of cyclohexane gave a clear, colorless and viscous liquid having a viscosity of 1150 poise and containing 60% by weight of non volatile matter, the balance being mainly cyclohexane.

A pressure-sensitive adhesive tape prepared by using the thus obtained liquid product in the same manner as in Example 1 had properties of; at least 32 of ball-tack; 690 g/19 mm of adhesive bonding strength; and 0.04 mm of cohesive force.

COMPARATIVE EXAMPLE 1

The same toluene solution of the two organopolysiloxanes as in Example 1 was heated at 113° C. for 5 days without addition of ammonia water. The results were that the desired reaction did not proceed and no pressure-sensitive adhesive could be obtained.

COMPARATIVE EXAMPLE 2

The experimental procedure was substantially the same as in Example 1 except that sodium hydroxide in an amount of 30 ppm by weight based on the total amount of the organopolysiloxanes was added to the reaction mixture in place of the ammonia water and the reaction temperature was 100° C. The mixture after 12 hours of the reaction had a viscosity of 320 poise.

A pressure-sensitive adhesive tape prepared by using the thus obtained liquid product in the same manner as in Example 1 had properties of: 24 of ball-tack 460 g/19 mm of adhesive bonding strength; and 1.20 mm of cohesive force. It was clear that the pressure-sensitive adhesive prepared by using sodium hydroxide as the catalyst was inferior to those prepared according to the inventive method.

What is claimed is:

1. A method for the preparation of a silicone-based pressure-sensitive adhesive which comprises the steps of:

(a) adding ammonia water to a mixture of a first organopolysiloxane having a substantially linear molecular structure represented by the average unit formula $R^1_m SiO_{(4-m)/2}$, in which $R^1$ is a substituted or unsubstituted monovalent hydrocarbon group and m is a positive number in the range from 1.8 to 2.1, at least 90% by moles of the organosiloxane units being diorganosiloxane units of the formula $R^1_2SiO$, and a second organopolysiloxane composed mainly of monofunctional siloxane units of the formula $R^2_3SiO_{0.5}$, in which $R^2$ is a substituted or unsubstituted monovalent hydrocarbon group, and tetrafunctional siloxane units of the formula $SiO_2$, the molar ratio of the monofunctional siloxane units to the tetrafunctional siloxane units being in the range from 0.4 to 2.0, to form a reaction mixture;
(b) agitating the reaction mixture to effect the siloxane rearrangement reaction between the first and the second organopolysiloxanes; and
(c) removing the ammonia water from the reaction mixture.

2. The method for the preparation of a silicone-based pressure-sensitive adhesive as claimed in claim 1 wherein the group denoted by $R^1$ is selected from the group consisting of methyl, phenyl and vinyl groups.

3. The method for the preparation of a silicone-based pressure sensitive adhesive as claimed in claim 1 wherein the group denoted by $R^2$ is a methyl group or phenyl group.

4. The method for the preparation of a silicone-based pressure-sensitive adhesive as claimed ;n claim 1 wherein the first organopolysiloxane has an average degree of polymerization in the range from 100 to 10,000.

5. The method for the preparation of a silicone-based pressure-sensitive adhesive as claimed in claim 1 wherein the weight ratio of the first organopolysiloxane to the second organopolysiloxane is in the range from 0.3 to 3.0.

6. The method for the preparation of a silicone-based pressure-sensitive adhesive as claimed in claim 1 wherein the amount of the ammonia water is in the range from 0.2 to 2.0% by weight based on the total amount of the first organopolysiloxane and the second organopolysiloxane, the amount of the ammonia water being calculated for an ammonia water containing 27% by weight of ammonia.

7. The method for the preparation of a silicone-based pressure sensitive adhesive as claimed in claim 1 wherein the reaction mixture is agitated in step (b) at a temperature in the range from 30° to 60° C.

8. The method for the preparation of a silicone-based pressure-sensitive adhesive as claimed in claim 1 wherein in step (a) the reaction mixture is admixed with an organic solvent.

9. The method for the preparation of a silicone-based pressure-sensitive adhesive as claimed in claim 8 wherein the organic solvent is a solvent capable of azeotropically distilling with water.

10. The method for the preparation of a silicone-based pressure-sensitive adhesive as claimed in claim 1 wherein the ammonia water is removed from the reaction mixture in step (c) by heating the reaction mixture at a temperature in the range from 100° to 120° C.

11. The method for the preparation of a silicone-based pressure-sensitive adhesive as claimed in claim 1 which further comprises the step of admixing the reaction mixture after removal of the ammonia water with a crosslinking agent.

12. The method for the preparation of a silicone-based pressure sensitive adhesive as claimed in claim 11 wherein the crosslinking agent is an organic peroxide.

* * * * *